US012649549B2

(12) United States Patent
Brauer et al.

(10) Patent No.: US 12,649,549 B2
(45) Date of Patent: Jun. 9, 2026

(54) DIAGNOSTICS SYSTEM FOR A DUAL PROPELLER DRIVE UNIT

(71) Applicant: VOLVO PENTA CORPORATION, Gothenburg (SE)

(72) Inventors: Samuel Brauer, Gothenburg (SE); Lars Wik, Sävedalen (SE); Johan Tell, Gothenburg (SE)

(73) Assignee: VOLVO PENTA CORPORATION, Gothenburg (SE)

( * ) Notice: Subject to any disclaimer, the term of this patent is extended or adjusted under 35 U.S.C. 154(b) by 187 days.

(21) Appl. No.: 18/394,453

(22) Filed: Dec. 22, 2023

(65) Prior Publication Data

US 2024/0227994 A1 Jul. 11, 2024

(30) Foreign Application Priority Data

Jan. 10, 2023 (SE) .................................... 2350008-5

(51) Int. Cl.
*B63B 79/30* (2020.01)
*B60L 3/00* (2019.01)
(Continued)

(52) U.S. Cl.
CPC ............ *B63B 79/30* (2020.01); *B60L 3/0046* (2013.01); *B60L 15/007* (2013.01); *B63B 79/10* (2020.01);
(Continued)

(58) Field of Classification Search
CPC ......... G06F 30/17; B66C 13/48; G06Q 50/08; G06Q 10/047; B63B 79/30; B63B 79/10;
(Continued)

(56) References Cited

U.S. PATENT DOCUMENTS

| | | | | |
|---|---|---|---|---|
| 6,986,688 B1 * | 1/2006 | Jansen | .................. | B63H 21/17 440/6 |
| 9,441,724 B1 | 9/2016 | Pugh | | |

(Continued)

FOREIGN PATENT DOCUMENTS

| | | |
|---|---|---|
| CN | 111301655 B | 3/2021 |
| CN | 109407635 B | 7/2021 |

(Continued)

OTHER PUBLICATIONS

Extended European Search Report dated Jun. 4, 2024 in corresponding European Patent Application No. 23220663.1, 9 pages.

(Continued)

*Primary Examiner* — Jelani A Smith
*Assistant Examiner* — Alyssa Rorie
(74) *Attorney, Agent, or Firm* — Jeffri A. Kaminski; Venable LLP

(57) ABSTRACT

A computer implemented diagnostics system for a marine propeller drive unit is provided. The diagnostics system comprising processing circuitry connected to a speed sensor system and to a control unit associated with the electric machine. The speed sensor system is arranged in connection to the differential arrangement to provide propeller speed data to the processing circuitry indicative of a speed of rotation of at least one of the propeller axles of the self-balancing propeller drive unit. The control unit is arranged to provide motor current data to the processing circuitry indicative of a motor current drawn by the electric machine. The processing circuitry is arranged to monitor the motor current data from the control unit, and the propeller speed data from the speed sensor system, and to classify a state of the self-balancing propeller drive unit into a pre-determined number of states comprising one or more fault states, based on the motor current data and on the propeller speed data.

(Continued)

The processing circuitry is arranged to trigger an action by the diagnostics system in case the state of the self-balancing propeller drive unit is classified as a fault state.

19 Claims, 3 Drawing Sheets

(51) Int. Cl.

| | |
|---|---|
| ***B60L 15/00*** | (2006.01) |
| ***B63B 79/10*** | (2020.01) |
| ***B63B 79/40*** | (2020.01) |

(52) U.S. Cl.
CPC .......... *B63B 79/40* (2020.01); *B60L 2200/32* (2013.01); *B60L 2210/40* (2013.01)

(58) Field of Classification Search
CPC ....... B63B 79/40; B63B 79/00; B60L 3/0046; B60L 15/007; B60L 2200/32; B60L 2210/40; B63H 2020/006; B63H 2023/067; B63H 5/125; B63H 21/17; B63H 2005/106; B63H 5/10; B63H 2005/1256; B63H 21/21; B63H 23/34
See application file for complete search history.

(56) References Cited

U.S. PATENT DOCUMENTS

| | | | | |
|---|---|---|---|---|
| 10,543,886 | B2 | 1/2020 | Van Miert | |
| 10,787,275 | B2 | 9/2020 | Huth et al. | |
| 2007/0250227 | A1* | 10/2007 | Fossen | B63B 79/20<br>701/21 |
| 2008/0089786 | A1 | 4/2008 | Sinreich | |
| 2009/0124146 | A1* | 5/2009 | Reuter | B63H 5/10<br>440/75 |
| 2009/0215334 | A1* | 8/2009 | Suzuki | B63H 23/30<br>440/85 |
| 2010/0125383 | A1 | 5/2010 | Caouette | |
| 2014/0327347 | A1 | 11/2014 | Rebele et al. | |
| 2018/0304969 | A1* | 10/2018 | Van Miert | B63J 99/00 |
| 2019/0296680 | A1* | 9/2019 | Das | H02P 29/032 |
| 2021/0114706 | A1* | 4/2021 | Marquis | B63H 21/21 |
| 2022/0194542 | A1* | 6/2022 | Kirchhoff | B63H 21/21 |
| 2024/0051107 | A1* | 2/2024 | Petersson | H02P 29/02 |

FOREIGN PATENT DOCUMENTS

| | | | | |
|---|---|---|---|---|
| DE | 102021203998 A1 | 3/2022 | | |
| EP | 2202145 A1 | 6/2010 | | |
| EP | 2347952 A2 | 7/2011 | | |
| EP | 4309996 A1 * | 1/2024 | | B63H 21/17 |
| IN | 202011031017 | 11/2020 | | |
| JP | 2021102429 A | 7/2021 | | |
| WO | 2017198892 A1 | 11/2017 | | |

OTHER PUBLICATIONS

Swedish Intellectual Property Office Notification under Article 19 of the Patents Act dated Dec. 19, 2023 in corresponding Swedish Patent Application No. 2350008-5, 4 pages.

Swedish Final Notice and Search Report in corresponding Swedish Application No. 2350008-5 dated Sep. 8, 2023 (7 pages).

* cited by examiner

DIAGNOSTICS SYSTEM FOR A DUAL PROPELLER DRIVE UNIT

TECHNICAL FIELD

This disclosure relates generally to computer implemented diagnostics systems for fault detection in marine multi-propeller systems. In particular aspects, the disclosure relates to fault detection in propeller systems comprising two self-balancing propellers driven by at least one electric machine. Although the disclosure may be described with respect to a particular boat or ship, the disclosure is not restricted to any particular type of marine vessel.

BACKGROUND

Electric propulsion systems are becoming more and more common in marine leisure craft and smaller commercial vessels such as ferries and the like.

There is a desire to detect when faults occur in marine drivelines. For this reason, a plurality of sensors is often mounted in connection to key parts of the propulsion system in order to detect when faults occur. These advanced sensor systems drive cost and may themselves malfunction.

Driveline diagnostics systems are often tailored to a specific driveline set-up, i.e., to a certain propeller design and transmission. This means that many different versions of a diagnostics system have to be designed, which is inefficient. Erroneous configuration of a driveline diagnostics system may also lead to false positives in error detection.

There is a desire for reliable diagnostics systems with a reduced number of sensors. There is also a desire for propeller system agnostic diagnostics systems which are able to adapt to different types of marine drivelines and propeller types.

As always, there is a desire for prolonging service intervals associated with marine drive units.

SUMMARY

Aspects of the present disclosure seek to provide improved diagnostics systems for multi-propeller marine drive units, such as dual propeller drive units. Towards this end, there is disclosed a computer implemented diagnostics system for a self-balancing marine drive unit comprising a differential arrangement arranged to distribute an input drive torque between at least two propellers of the propeller system. The computer implemented diagnostics system comprises processing circuitry which is connected to a speed sensor system associated with the propeller system and also to a control unit associated with the electric machine. The speed sensor system is arranged in connection to the differential arrangement to provide propeller speed data to the processing circuitry indicative of a speed of rotation of at least one of the propeller axles of the self-balancing propeller drive unit. The control unit is also arranged to provide motor current data to the processing circuitry indicative of a motor current drawn by the electric machine. The processing circuitry is arranged to monitor the motor current data received from the control unit, and the propeller speed data received from the speed sensor system, and to classify a state of the self-balancing propeller drive unit into a pre-determined number of states comprising one or more fault states, based on the combination of motor current data and propeller speed data. The processing circuitry is also arranged to trigger an action by the diagnostics system in case the state of the self-balancing propeller drive unit is classified as a fault state, such as generation of a warning signal to an adaptation of electric machine control. Aspects of the disclosure may seek to provide diagnostics systems that are able to quickly detect and classify fault states that occur in the drive unit, such as propeller damage, transmission wear, overheating, propeller biofouling, and the like. The combination of motor current data and speed sensor data has been shown to yield particularly accurate and reliable results. This is at least in part since the characteristics of the motor current data is highly dependent on the different propeller speeds of the self-balancing propeller system. The frequency content of the motor current data, for instance, normally comprises spectral peaks at fixed multiples of the propeller speeds. By knowing the propeller speeds of the system, the diagnostics system can efficiently verify that the spectral content of the motor current data is as expected. If an anomaly is detected, then a fault can quickly be declared and action to mitigate the consequences of the fault can be taken in an automated fashion. The type of fault can then be selected based on the detected discrepancy in combination with the propeller speed data.

The diagnostics systems can be realized using pre-processed input data derived from the raw motor current data and the raw propeller speed data, such as Fourier transformed input data, or as systems taking the motor current data and the propeller speed data as a direct input without pre-processing.

In some examples, the control unit associated with the electric machine is an inverter arranged to convert a direct current (DC) feed into an alternating current (AC) motor feed for driving the electric machine. Such inverters are already present in most electric drivelines, and can be re-used for diagnostics purposes as described herein, which is an advantage. The inverter knows the speed and often also the applied torque on the motor axle, which is data that can be used by the diagnostics system.

The motor current data preferably but not necessarily comprises direct-quadrature-zero (D-Q) transformed motor current data. This type of transformed data is relatively easy to analyze from an algorithmic point of view, leading to an implementation of reduced complexity compared to many alternative implementations, which is an advantage. The processing circuitry may for instance be arranged to obtain a frequency representation of the motor current data, to determine a difference between the obtained frequency representation and an expected frequency representation, and to classify the state of the self-balancing propeller drive unit into a fault state in case the difference does not satisfy an acceptance criterion. A frequency representation can be conveniently obtained using, e.g., a fast Fourier transform, a wavelet transform, or the like. It can be shown that efficient and accurate diagnostics systems can be realized based on this type of input data. A frequency representation is also intuitive to the human mind, which promotes understanding of the underlying physical mechanisms upon which the diagnostics system is based. A service technician may, for instance, view frequency logs after a fault has occurred and thus obtain a better understanding of the root-cause of the fault, e.g., by comparing the frequency log to expected frequency log values and to frequency log values indicative of known fault states. The difference between the obtained frequency representation and the expected frequency representation can for instance be determined in respect of any of; the number of frequency peaks, the frequency location of frequency peaks, the absolute and/or relative amplitude of frequency peaks, the frequency width of frequency peaks, frequency sub-band power, and frequency sub-band entropy.

The frequency can be normalized to the measured propeller speeds, i.e., given relative to a propeller speed. A normalization can be obtained, e.g., by dividing all frequency components in the motor current data by one of the propeller speeds, for instance the lowest propeller speed, or by an average of the propeller speeds. Hence, the propeller speed data can be used also for normalization, which is ab advantage.

In some examples, the processing circuitry is arranged to select the fault state in dependence of the propeller speed data. Using the propeller speed data, it can, e.g., be ascertained which propeller that has started to rotate faster or slower compared to its nominal speed of rotation. This information is often valuable when selecting a fault state out of a number of possible fault states having similar effects on the characteristics of the motor current data. Thus, it is understood that the combination of motor current data and propeller speed data is particularly efficient for implementing an accurate diagnostics system.

In some examples, the processing circuitry is arranged to obtain a fault model configured to classify the state of the self-balancing propeller drive unit into the pre-determined number of states, based on the monitored motor current data and on the propeller speed data, where the fault model has been trained a-priori using recorded values of combinations of monitored motor current data and propeller speed data corresponding to the one or more fault states. The diagnostics systems discussed herein may be implemented, at least in part, using techniques from the field of machine learning and artificial intelligence. By gathering an amount of data that illustrates various fault states, a diagnostics system can be trained to recognize the fault states in real time as they occur, using methods known in the art. The processing circuitry may also be arranged to obtain a fault model configured to classify the state of the self-balancing propeller drive unit into the pre-determined number of states, based on the monitored motor current data and on the propeller speed data, and to train the fault model based on monitored motor current data and propeller speed data during operation of the propeller drive unit, conditioned on the current classified state of the self-balancing propeller drive unit. Thus, the diagnostics systems discussed herein may also be refined during use of the system, which is an advantage. The fault model may, e.g., be based on a random forest ensemble learning technique or on a neural network of some sort, such as a convolutional neural network or other type of neural network. The exact type of machine learning model is not overly important. Rather, many alternatives exist, of which the skilled person is aware.

In some examples, the processing circuitry is arranged to determine a difference in propeller speeds between the at least two propellers of the propeller system. The processing circuitry may then be arranged to obtain a fault model configured to classify the state of the self-balancing propeller drive unit into the pre-determined number of states, based on the monitored motor current data and propeller speed data, and to train the fault model based on monitored motor current data and propeller speed data during operation of the propeller drive unit, conditioned on that the difference in propeller speeds between the at least two propellers of the propeller system satisfies an acceptance criterion. A too large difference in propeller speeds is often indicative of a fault state. Hence, by training the fault model in real-time (during use of the drive unit) conditioned on that the propeller speeds are not differing too much, erroneous training of the diagnostics system can advantageously be avoided.

In some examples, the processing circuitry is also arranged to receive an updated fault model from an external entity and to replace a current fault model by the updated fault model. Thus, the fault model used by the system can be updated from an external entity, i.e., replaced by a better model. This external entity may, e.g., be set up to gather data from more than one drive unit, on more than one vessel, and thus arrive at a more refined fault model compared to if the training is only done locally. The processing circuitry may of course also feed its trained fault model back to the external entity, which may then merge the inputs from more than one diagnostics system. This way the system becomes a fleet management system that manages operation of a number of boats and ships to detect and take action when fault events occur.

In some examples, the processing circuitry is arranged to obtain reference data related to motor current data and propeller speed data for a plurality of different propeller types. The processing circuitry may then detect a propeller type of the propeller system based on a comparison between the monitored motor current data and propeller speed data and the obtained reference data. This means that the diagnostics system becomes somewhat agnostic to the technical characteristics of the drive line, reducing the need for drive unit specific configuration, which is an advantage. In some related examples, the processing circuitry is arranged to obtain reference data related to motor current data and propeller speed data for a plurality of different driveline transmission types, and to detect a transmission type of the propeller system based on a comparison between the monitored motor current data and propeller speed data and the reference data.

Each fault state may furthermore be associated with one out of a pre-determined number of severity levels. Some fault states may just prompt an informal message informing a user of the occurrence, while other fault states may be more severe, requiring immediate action to mitigate the consequences of the event. The triggered action by the system may comprise notifying an operator of the fault state and its associated severity level. This triggered action optionally comprises disabling the electric machine in case the current state is classified as a fault state associated with a pre-determined severity level.

Methods, computer programs, and computer program products are also disclosed herein which are associated with the above-mentioned advantages.

The above aspects, accompanying claims, and/or examples disclosed herein above and later below may be suitably combined with each other as would be apparent to anyone of ordinary skill in the art.

Additional features and advantages are disclosed in the following description, claims, and drawings, and in part will be readily apparent therefrom to those skilled in the art or recognized by practicing the disclosure as described herein. There are also disclosed herein control units, computer systems, computer readable media, and computer program products associated with the above discussed technical benefits.

BRIEF DESCRIPTION OF THE DRAWINGS

With reference to the appended drawings, below follows a more detailed description of aspects of the disclosure cited as examples.

DETAILED DESCRIPTION

Figure 1:
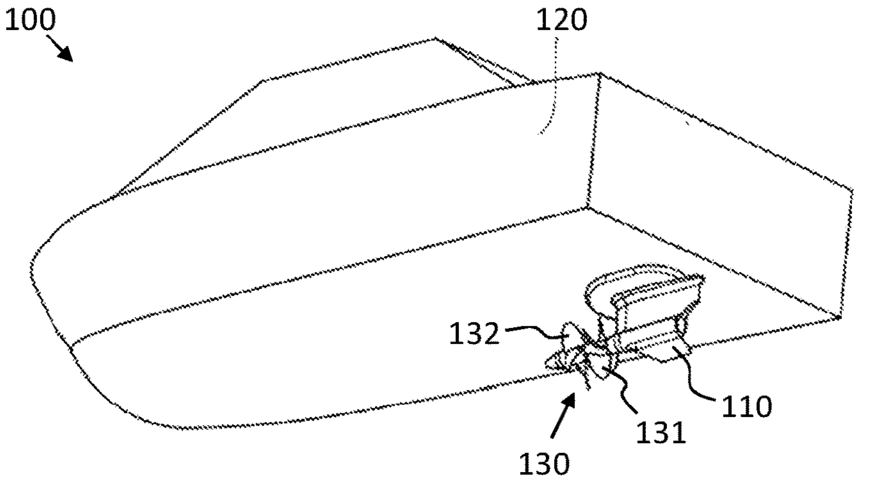
FIG. 1 illustrates an example marine vessel.

The present disclosure will now be described more fully hereinafter with reference to the accompanying drawings, in which exemplary embodiments are shown. The disclosure may, however, be embodied in many different forms and should not be construed as limited to the embodiments set forth herein; rather, these embodiments are provided for thoroughness and completeness. Like reference character refer to like elements throughout the description.

Aspects set forth below represent the necessary information to enable those skilled in the art to practice the disclosure.

FIG. 1 schematically illustrates an example marine vessel 100 with a drive unit 110 attached to a hull 120 of the vessel 100. The drive unit 110 comprises a propeller system 130, in this case a counter-rotating dual propeller system driven by an electric machine arranged in-board the vessel 100 (not shown in FIG. 1).

The drive units discussed herein are electrically powered drive units that comprise one or more electric machines arranged to generate torque to rotate the propellers of the drive unit. Hybrid electric drive units that comprise combinations of combustion engines and electric machines are also considered as electrically powered drive units herein. The techniques described below are thus applicable in all forms of drive units which comprise at least one electric machine arranged to power a propeller system with two or more propellers. Drive units with two propellers are the most common, often referred to as duo-prop drive units, although more than two propellers can also be used. The propellers in a multi-propeller drive unit often have different number of blades. The foremost propeller (propeller 132 in FIG. 1) normally has fewer blades than the aftmost propeller. The foremost propeller may, e.g., have three blades and the aftmost propeller may have four blades.

A propeller system may be pushing or pulling. The example in FIG. 1 is a pulling propeller system. A pushing propeller system is obtained by rotating the propeller system by 180 degrees in FIG. 1 such that the propellers instead face aft. The proximal propeller, i.e., the propeller closest to the drive leg, is normally referred to as the inner propeller 131 while the distal propeller is referred to as the outer propeller 132.

Figure 2:
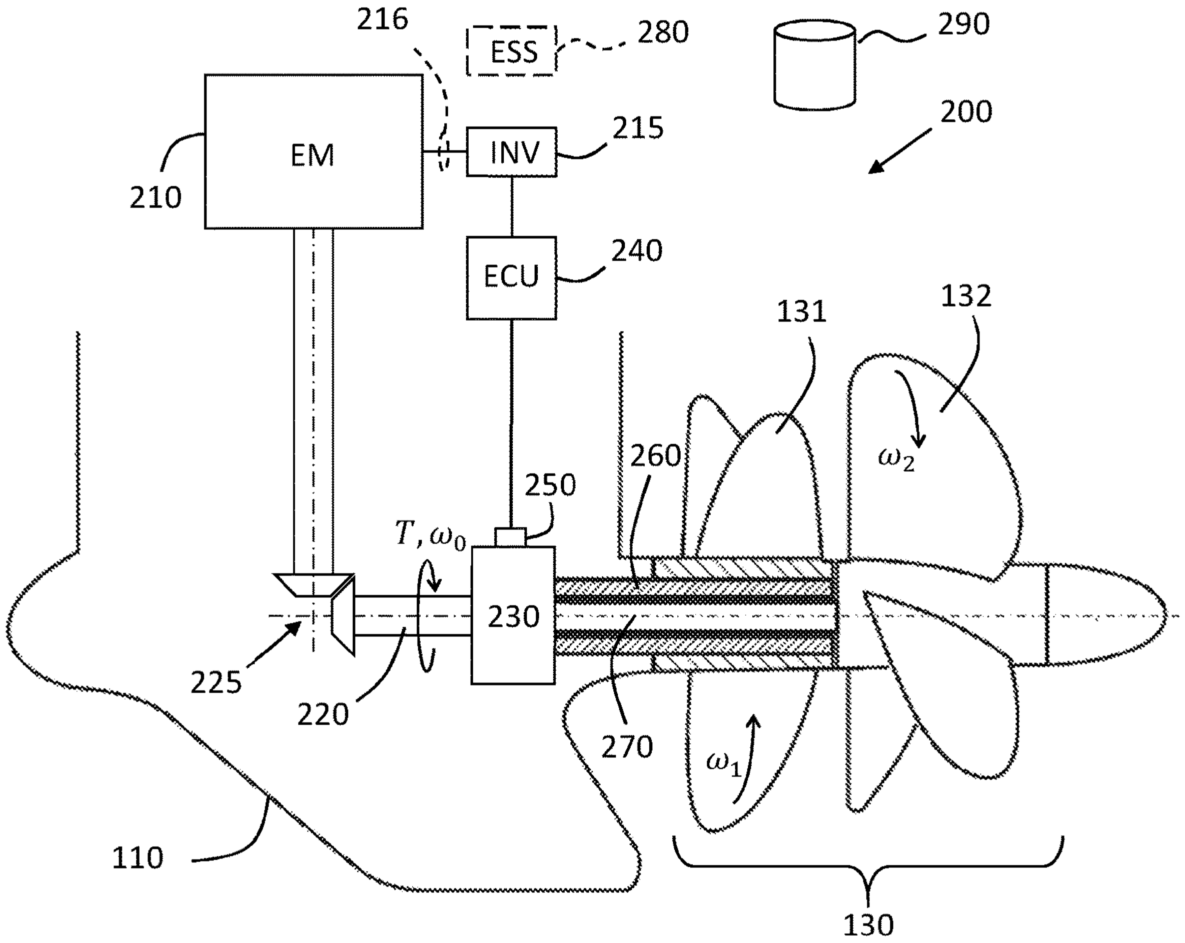
FIG. 2 illustrates an example self-balancing dual propeller drive unit.

With reference also to FIG. 2, the speed of the drive axle is referred to as $\omega_0$, while the speeds of the inner and outer propellers are referred to as $\omega_1$ and $\omega_2$, respectively. The input drive shaft is associated with a drive torque T.

Figure 3:
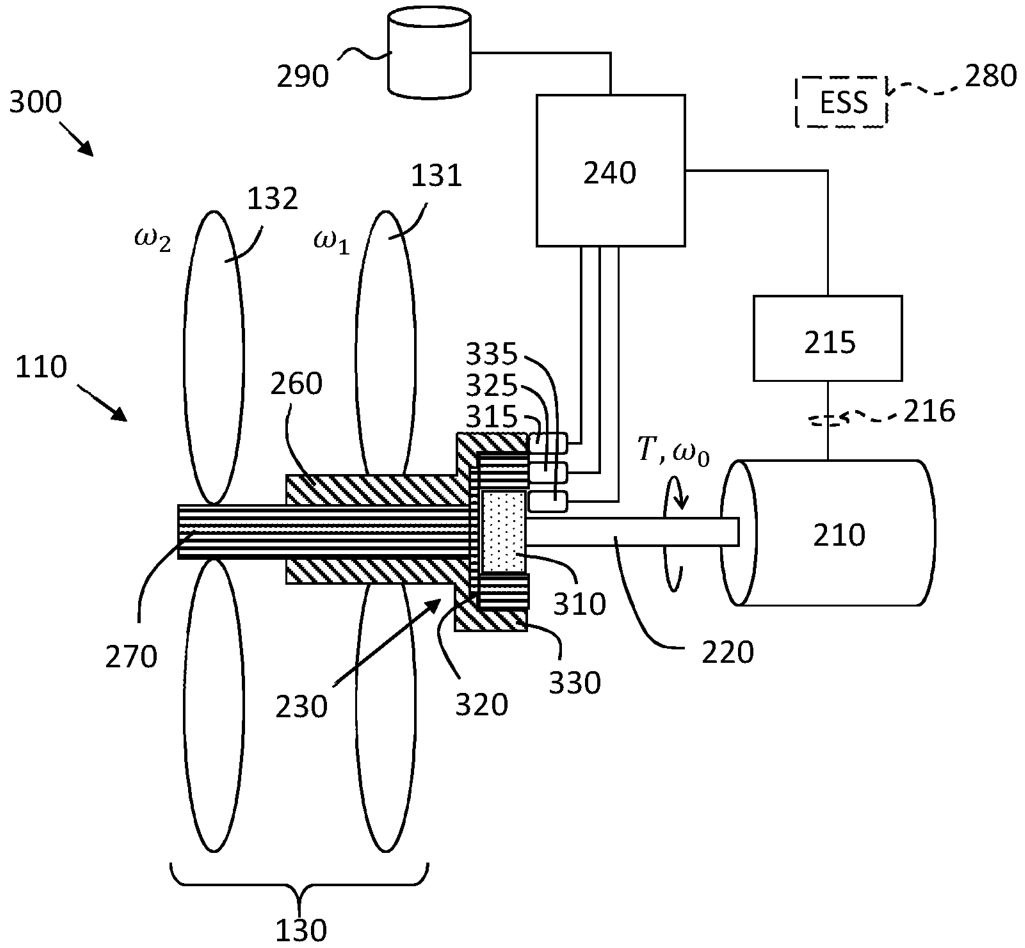
FIG. 3 schematically illustrates a self-balancing transmission arrangement.

Outboard drive units are also possible, where the electric machine and the propeller system are both arranged outboard of the vessel hull 120. Thus, the electric machine or machines may be arranged inboard or outboard, or both inboard and outboard. For the case of an outboard electric machine, the machine may be arranged above or below the water line, e.g., as a submerged pod drive solution. The one or more electric machines are connected to the propeller system via a drive axle 220. This drive axle 220 may comprise a vertical drive axle component as illustrated in FIG. 2, that connects the electric machine (EM) 210 to the propeller system 130 via a bevel gear arrangement 225 or the like. The drive axle 220 may also be a pure horizontal drive axle as illustrated in FIG. 3. Other axle arrangements are also possible, and the present disclosure is not limited to any particular form of drive axle geometry. The electric motor 210 is controlled by a control unit 215, referred to herein as an inverter, via a motor interface 216 through which motor current flows. The terms electric motor control unit and electric motor inverter will be used interchangeably herein. It is appreciated that the power electronics comprised in the inverter used to drive the electric motor may be separate from the electric machine control unit 215 or integrated as a single physical unit. The inverter operation is in turn controlled by processing circuitry 240, which may comprise one or more control units and/or computer systems. The motor interface 216 between the inverter 215 and the electric machine 210 may vary in function and physical realization, but the inverter generally controls electric motor speed over the interface, and may both accelerate and decelerate, i.e., brake, the electric motor via the motor interface. The inverter draws direct current (DC) from an electrical energy storage (ESS) system of the vessel 100 and feeds this electrical energy to the motor 210 to generate the desired drive axle torque or speed. The ESS system 280 is only schematically illustrated in FIG. 2 and in FIG. 3.

The electric motor arranged to drive the propeller system 130 may be a permanent magnet synchronous motor (PMSM) which is an alternating current (AC) synchronous motor whose field excitation is provided by permanent magnets, and which has a sinusoidal counter-electromotive force (counter EMF) waveform, also known as back electromotive force (back EMF) waveform. PMSM motors are known in general and will therefore not be discussed in more detail herein. For instance, similar electrical motors including associated control methods are discussed in "Electric Motors and Drives" (Fifth Edition), Elsevier, ISBN 978-0-08-102615-1, 2019, by Austin Hughes and Bill Drury. Other types of electric machines are of course also possible to use in this setting. It is appreciated that the techniques discussed herein are applicable together with a large variety of different drive units, comprising various forms of transmission arrangements and power source configurations.

The electric machine 210 may be a three-phase motor. In this case the motor interface 216 between inverter and electric machine (rotor and stator) comprises three separate wires for energizing the motor windings. The inverter is a module which generates one or more phases of alternating current, normally from a direct current (DC) feed. By controlling the frequency and voltage of the phases over the motor interface, the electromagnetic field in the motor can be brought into a controlled rotation to generate a positive or negative drive torque T by the motor drive axle 220.

The direct-quadrature-zero transformation, often simply referred to as the D-Q transform, is a tensor that rotates the reference frame of a three-element vector or a three-by-three element matrix in an effort to simplify analysis. The D-Q transform is the product of the Clarke transform and the Park transform. The D-Q transform is often used in the context of electrical engineering with three-phase circuits, such as when operating an electric machine. The transform can be used to rotate the reference frames of AC waveforms such that they become DC signals. Simplified calculations can then be carried out on these DC quantities before performing the inverse transform to recover the actual three-phase AC results. As an example, the D-Q transform is often used in order to simplify the analysis of three-phase synchronous machines or to simplify calculations for the control of three-phase inverters. In analysis of three-phase synchronous machines the transformation transfers three-phase stator and rotor quantities into a single rotating reference frame to eliminate the effect of time-varying inductances and transform the system into a linear time-invariant system. D-Q transforms are generally known and will therefore not be discussed in more detail herein.

With reference to FIG. 2 and to FIG. 3, the drive units 110 discussed herein comprise so-called self-balancing propeller systems, where a differential arrangement 230 is used to distribute drive torque from a single input shaft over the propellers 131, 132 of the drive unit 110. A differential arrangement is a gear train with three (or more) drive shafts that has the property that the rotational speed of one shaft is a fixed multiple of the average of the speeds of the others. The torque applied on an input shaft is distributed over the two output shafts according to a fixed relation determined by the differential arrangement geometry.

Mathematical methods for determining this fixed relation are known in the art and will therefore not be discussed in more detail herein.

A planetary gear can be used to distribute torque in a differential arrangement, and also to bring down the speed of the drive axle 220 to a lower propeller axle speed. It is an advantage to maintain a relatively high electric motor axle speed since this makes it easier to obtain high power. With reference to the example in FIG. 3, the sun gear 310 of the planetary gear can be connected to the drive axle 220 of the EM. The inner propeller 131 can be driven by a hollow drive axle 260 connected to the ring gear 330, while the outer propeller 132 can be driven by an axle 270 connected to the planetary gear carrier 320.

The EM 210 is driven by a control unit 215 such as an inverter which generates the required motor currents that operate the electric machine 210. The electric machine, and the inverter in particular, is controlled by processing circuitry 240 schematically illustrated in FIG. 2 and in FIG. 3. An example realization of this processing circuitry 240 will be discussed in more detail below in connection to FIG. 6. The processing circuitry 240 may be arranged as a separate unit or integrated with the electric machine 210, or even with the inverter 215. The processing circuitry may also comprise one or more processing units, possibly distanced from each other. The computer implemented diagnostics methods discussed herein may be implemented on a control unit comprised in the electric machine inverter, on processing circuitry comprised in a separate control unit such as an electronic control unit (ECU) or distributed over more than one processing unit. An example computer system which can be used to realize at least parts of the computer-implemented systems discussed herein will be described in connection to FIG. 6 below.

The processing circuitry 240 is configured to perform a drive unit diagnostics operation intended to monitor the status of the drive unit, comprising, e.g., its propellers, transmission, and electric machine. The diagnostics operation may comprise triggering warnings in case a fault in the drive unit is suspected, or a request for servicing of the drive unit in case the suspected fault is not deemed serious. The diagnostics operation may also comprise detecting serious faults in the drive unit, in which case the processing circuitry 240 may inactivate the drive unit, or at least limit an operational domain of the drive unit, such as reducing a maximum allowed drive axle speed or torque.

An advantage of having an accurate on-board diagnostics system is that the service intervals of the drive unit can often be extended. This is because the diagnostics system can be relied upon to detect when faults are about to occur, or at least when faults have occurred, thereby reducing the need for manual inspection of the components of the drive unit at regular intervals.

It has been realized that the currents drawn by the electric machine 210 over the motor interface, and the internal state variables of the inverter used to control the electric machine, comprise valuable information which can be used for real-time fault detection and drive unit diagnostics. The methods disclosed herein may be configured to not only detect fault states after they have occurred but also to indicate a fault state about to occur, i.e., a fault state associated with an increased risk of occurring in the near future, which of course is an advantage compared to diagnostic systems that only detect faults after they have occurred.

The control signals and internal parameters of the electric machine and its processing circuitry can be monitored, and different types of classification algorithms can be used to detect when the control signals are indicative of a fault state, as opposed to when the drive unit is operating normally. For instance, the currents over the motor interface (from inverter to motor windings) can be used to detect one or more fault states.

It has also been realized that fault detection algorithms for use with self-balancing drive unit comprising a differential arrangement 230 arranged to distribute a drive torque T from an electric machine 210 between at least two propellers 131, 132 of a propeller system 130 is made much better if propeller speed data indicative of a speed of rotation of at least one of the propeller axles 260, 270 of the self-balancing propeller drive unit 110 is taken as input, since this allows the algorithm to identify which propeller in the propeller system that is responsible for a detected anomaly.

The detection mechanisms are advantageously based on machine learning techniques, although less complex classical signal processing methods can also be used with success. Different types of machine learning techniques have been applied with success in this context, but it has been found that algorithms based on random forest techniques are particularly effective and provide robust prediction of fault events. Various types of neural networks may also be applied with success to this classification task, such as convolutional neural networks.

Random forests or random decision forests represent an ensemble learning method for classification, regression and other tasks that operate by constructing a multitude of decision trees at training time and outputting the class that is the mode of the classes (classification) or mean/average prediction (regression) of the individual trees. Random decision forests are associated with the advantage of being able to correct for decision trees' habit of overfitting to their training set. Random forests generally outperform decision tree-based algorithms. As an alternative to random forest classification methods, a less complex decision tree algorithm can be used, often referred to as regression tree algorithms, which is basically a single tree random forest algorithm.

Some of the machine learning techniques discussed herein comprise the construction of a fault model which can be configured, i.e., "trained", using a plurality of examples of drive units which have experienced various fault states. Measurement data of one or more parameters related to the operation of the electric machine 210 is then stored and tagged with a respective fault state. The measurement data may, e.g., comprise motor current data, such as D-Q transformed motor current data, or Fourier transformed D-Q transformed motor current data.

This training data is then used to train the fault model in a training phase. The thus configured fault model can then be fed by measurement data in real-time during operation of the boat 100. If the drive unit experiences a fault state similar to one or more of the training examples, then the fault model is likely to classify the drive unit as being associated with a fault state. The fault model is not only able to determine that a given drive unit experiences a fault state, but it may also be configured to determine which fault state out of a pre-determined number of fault states that has occurred.

Any of real (physical world) data collected during an actual fault event in a physical motor drive system and computer simulated data collected during computer simulation of a fault event in a motor drive system can be used for training the machine learning structures discussed herein. The data can be gathered for one drive unit in one boat and used for training another drive unit in another boat, or for training the same drive unit in the same boat.

Training of a machine learning model for fault state classification is advantageously done using a hold-out dataset, where one part of the data set is used to train the model, and another part is used for verification of the trained model. The training data may be obtained from laboratory experiments, from practical experimentation using real-world boats, or as synthetic data generated by computer simulation of various drivelines having various fault conditions.

A problem with self-balancing propeller systems such as that illustrated in FIG. 2 and in FIG. 3 when it comes to performing fault detection and more general diagnostics operations is that the relation between drive axle speed $\omega_0$ and the propeller axle speeds $\omega_1$ and $\omega_2$ is not known a priori, and it is therefore difficult to obtain success using only the motor winding current data. This is because the motor current winding data primarily carries information associated with the drive axle 220, and it is difficult to identify which propeller in a dual propeller set-up that is causing an anomaly.

The propellers of a dual propeller system 130 have characteristic frequency orders, i.e., the back-EMF variation seen in the monitored current data has certain characteristics depending on the types of propellers used in the propeller system and on the type of transmission used in-between the electric motor or motors and the propellers. For instance, each time two counter rotating blades pass each other a change in resistance affecting the propellers is seen, which propagates into the frequency characteristics of the monitored motor current data. For instance, in a 3+4 blade propeller setup, i.e., a propeller set-up where one propeller has three blades and the other propeller has four blades, the blade passing order is 3+4=7. Each time a blade passes the hull of the boat there is also a slight disturbance in resistance, which can often be seen as a distinct frequency component in the monitored motor current data. This will be discussed in more detail below in connection to FIG. 4A.

The gears used in the transmission between electric motor 210 and the propeller system also has an impact on the characteristics of the monitored motor current data, such as a planetary gear and/or bevel gear arrangement. Depending on the particulars of the transmission arrangement, i.e., the different bearing components and the gear mesh configurations, a certain characteristic behavior can be expected, which will most likely be noticeable in the back-EMF of the electric motor 210 and thus also in the motor current data. Thus, the characteristics of a given transmission is normally evident in a frequency representation of the motor current data.

The design of the electric machine also contributes to the characteristics of the monitored motor current data, specifically in the frequency characteristics of the motor current data, mainly due to periodic variation in the generated back-EMF during operation of the drive unit. An impact can, for instance, be expected from the number of pole pair of the electric motor, from the number of stator slots, and from any unbalance in the electric motor, both mechanical imbalance and electrical imbalance.

To allow implementation of efficient and reliable diagnostics operations in drive units comprising self-balancing dual propeller systems, a speed sensor system 250 can be arranged in connection to the differential arrangement 230. This speed sensor system 250 provides data indicative of a speed of rotation of at least one of the propeller axles, i.e., either the inner axle 270 or the outer axle 260, or both. It has been found that a combination of winding current data related to the operation of the electric machine 210, and in particular its back-EMF, and the data from the speed sensor system 250 enables cost efficient and reliable diagnostics operations to be performed by the processing circuitry 240. The speed sensor system 250 may comprise any number of speed sensors, but one sensor is normally sufficient. FIG. 3 illustrates example speed sensors arranged to measure a speed of rotation of the sun gear 335, a speed of rotation of the planet carrier 325 and/or a speed of rotation of the outer ring gear 315. The output signal from this speed sensor system comprising one or more speed sensors is fed to the processing circuitry 240, as illustrated in FIG. 3.

Figure 4A:
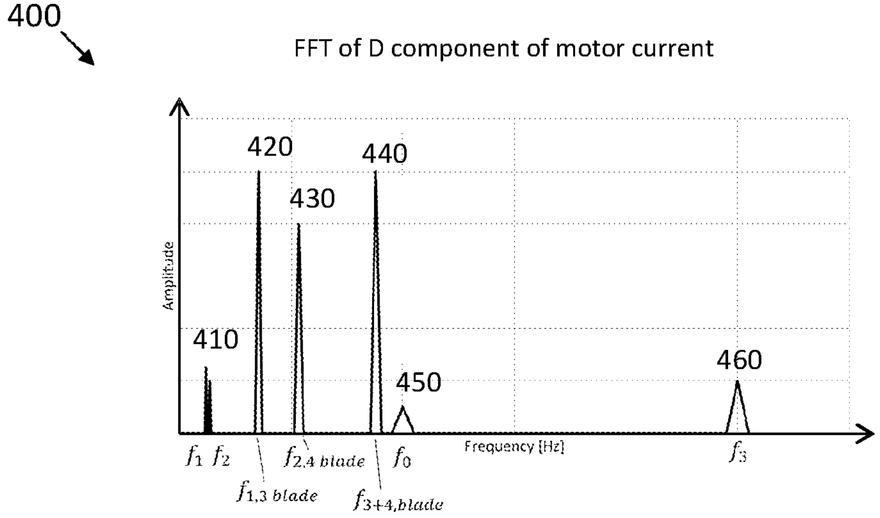
FIGS. 4A-B are graphs illustrating examples of frequency content of a motor current.

FIG. 4A schematically illustrates an example 400 of frequency-domain meta data that can be generated from components of a D-Q transformed motor current. A similar frequency representation can be obtained from speed sensor data sampled at sufficiently high frequency, or from vibration data sampled using an inertial measurement unit or the like. In FIG. 4A, the amplitude of some frequency components of the D-component of the motor current has been schematically illustrated. This particular example is for a drive line where an electric machine is operated at high rpm which is converted to a lower propeller speed by a transmission in-between electric machine drive axle and propeller axles. The rotation of the electric machine rotor gives rise to a frequency component 450 at frequency $f_0$. The axle speeds $\omega_1$, $\omega_2$ of the propellers 131, 132 give rise to base frequency components 410 at frequencies $f_1$ and $f_2$ respectively. The frequency components 410 at $f_1$ and $f_2$ may coincide for some drive units and differ for some other drive units. The frequency difference $f_2-f_1$ is often of interest, at least in self-balancing propeller systems, as mentioned above. A second peak 420 and a third peak 430 are observed above the base frequency components 410. These peaks are due to periodic increase in resistance as the blades of the propellers pass the hull of the vessel. In this example the first propeller has three blades and therefore generates a peak at frequency $f_{1,3\ blade}$, three times the frequency of the propeller speed $f_1$. The second propeller has four blades and therefore generates a component 430 at the slightly higher frequency $f_{2,4\ blade}$, four times the frequency of the propeller speed $f_2$. A change in resistance is also seen every time the propeller blades pass each other. This is seen as a peak 440 at frequency $f_{3+4,blade}$, at about seven time the propeller base frequencies. Finally, the gears in the transmission give rise to the highest frequency component 460 at frequency $f_3$.

Figure 4B:
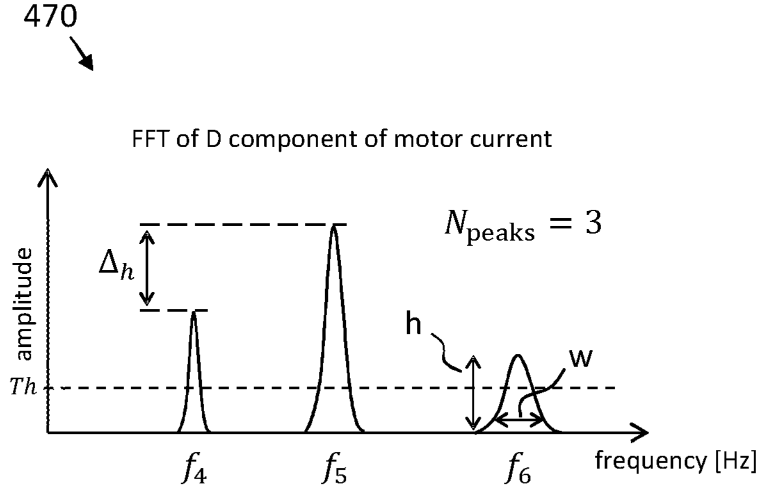

A frequency peak in a frequency representation of motor current can be characterized in terms of its width w and height h, as illustrated in the example 470 of FIG. 4B. The width w or spectral extent of a peak may, e.g., be measured as the 3 dB bandwidth of a frequency component. The contents of a Fourier transformed motor current generally is a collection of complex amplitude values where each complex value is associated with a frequency or a frequency bin. An amplitude of each such frequency component can be determined as the absolute value of the complex amplitude or the squared amplitude value. The peaks may also be characterized by relative height $\Delta_h$ as illustrated in FIG. 4B. The number of peaks ($N_{peaks}$) above some threshold value Th may also be significant input to a diagnostics system of the type discussed herein.

Note that the schematic graphs 400, 470 in FIG. 4A and in FIG. 4B are just for illustration purposes and only loosely based on a real-world example. However, it can be realized that, if something happens to the drive unit, for instance if one of the propellers loses a propeller blade, then the frequency characteristics of the monitored motor current will change rapidly. This change in frequency characteristics can be used for diagnostics purposes by the processing circuitry 240, which also uses the propeller speed data from the speed sensor system to identify which out of the at least two propellers 131, 132 of the propeller system 130 that have changed its characteristic impact on the characteristics of the monitored motor current. Thus, the output from the speed sensor system combined with the motor current data allows the algorithm to evaluate the most likely cause for a detected change in the monitored motor current data. The output from the speed sensor system is also useful since it allows the processing circuitry to predict where specific orders are placed on the frequency spectrum, i.e., where in frequency the frequency peaks of a given driveline can be expected to occur.

If a diagnostics algorithm is trained to recognize the propeller orders and suddenly one propeller loose one blade, then it can be difficult for the algorithm to determine which blade is missing, especially if the propellers have the same number of blades, i.e., to classify the detected anomaly into the correct fault state. The propeller that loses one blade will, however, start to accelerate to self-balance itself due to the decreased resistance. A speed sensor arranged on one of the propellers therefore makes it much easier for the algorithm to determine what happened, i.e., to classify the detected anomaly into the correct fault state out of a pre-determined number of states comprising one or more fault states.

The detection mechanisms applied by the computer implemented diagnostics system 200, 300 may vary in complexity from relatively straight forward frequency transforms and comparison operations to more advanced methods based on machine learning, as will be explained in more detail in the following.

To summarize, FIGS. 1-4 illustrate aspects of a diagnostics system 200, 300 for a self-balancing propeller drive unit 110, i.e., a drive unit 110 where drive torque T from one or more electric machines 210 is distributed via a single drive axle 220 to at least two propellers 131, 132 of a propeller system 130. The torque distribution is achieved by a differential arrangement 230 comprising a sun gear 310 that engages planetary gears on a carrier 320, which in turn engage a ring gear 330 in a known manner. The torque distribution ratio over the propellers is determined by the planetary gear geometry and is assumed to be known a-priori or estimated based on motor current data and speed sensor data collected in a calibration mode of operation where it is assumed that the drive unit state is free from fault. There is also a predetermined relationship between drive axle speed $\omega_0$ and the speeds of rotation $\omega_1$, $\omega_2$ of the least two propeller axles (260, 270) of the propeller system 130.

The diagnostics system 200, 300 comprises processing circuitry 240 connected to a speed sensor system 250 and at least indirectly to an inverter 215 of the electric machine 210. The processing circuitry is to be construed broadly to encompass any type of control system, such as the computer system 600 discussed below in connection to FIG. 6 or parts thereof. The speed sensor system 250 is arranged in connection to the differential arrangement 230 to provide data to the processing circuitry 240 indicative of a speed of rotation $\omega_1$, $\omega_2$ of at least one of the propeller axles 260, 270 of the self-balancing propeller drive unit 110. Towards this end, the speed sensor system 250 may comprise one or more speed sensors. A speed sensor may comprise a rotary encoder, also called a shaft encoder, which is an electro-mechanical device that converts the angular position or motion of a shaft or axle to analog or digital output signals. Both absolute and incremental rotary encoders can be used. The output of an incremental encoder such as a Hall effect sensor, provides information about the motion of the shaft, while an absolute encoder such as magnetic or capacitive absolute encoders provide information about the actual angle of the axle.

FIG. 3 illustrates some possibilities for arranging a speed sensor comprised in the speed sensor system 250. A first option is to arrange a speed sensor 315 to measure the speed of rotation of the ring gear 330 and/or the speed $\omega_1$ of the hollow propeller axle 260 associated with the inner propeller 131 of the propeller system 130. The rotation speed of the planet carrier 320, i.e., the rotation speed $\omega_2$ of the outer propeller 132 can then be obtained using the speed relationship of the planetary gear arrangement 230, i.e.

$$N_s\omega_0 + N_r\omega_1 = (N_s + N_r)\omega_2$$

where $N_s$ is the number of teeth on the sun gear, $N_r$ is the number of teeth on the ring gear, $\omega_0$ is the speed of the drive axle 220, $\omega_1$ is the propeller axle speed of the inner propeller 131 and $\omega_2$ is the propeller axle speed of the outer propeller 132, where it is assumed that the electric machine drive axle speed $\omega_0$ is known from the inverter control routine, and that the geometry of the planetary gear arrangement ($N_s$ and $N_r$) is known a-priori or estimated during a calibration mode of operation where it is assumed that the drive unit state is free from fault. The same relationship can be used if instead the rotation speed $\omega_2$ of the outer propeller 132 is measured by a speed sensor 325. A speed sensor 335 can of course also be comprised in the speed sensor system 250 to measure the speed of the sun gear 310 or the drive axle speed $\omega_0$, for redundancy purposes or if the drive axle speed of the electric machine 210 is for some reason not available. It is noted that it is sufficient if one of the speed sensors 315, 325, 335 is available.

The processing circuitry 240 is arranged to monitor the motor current drawn by the electric machine 210 in combination with the propeller speed data provided by the speed sensor system 250, and to classify a state of the self-balancing propeller drive unit 110 into a pre-determined number of states comprising one or more fault states, based on the combination of monitored motor current data and propeller speed data. As noted above, this combination of motor current data input and propeller speed data input has been found particularly advantageous for the purpose of error detection and fault classification. The fault states may, for instance, comprise propeller damage, where one or more propellers in the propeller system 130 has lost one or more propeller blades. The fault states may also comprise other types of faults, such as propeller blade damage (a dent or deformation of a propeller blade), bearing damage, damage to the differential arrangement 230, and problems associated with the electric machine 210 such as its windings or stator, or mechanical components 225 in the transmission between electric machine 210 and differential arrangement 230. The processing circuitry 240 is arranged to trigger an action by the diagnostics system 200, 300 in case the state of the self-balancing propeller drive unit 110 is classified as a fault state. Each fault state is optionally associated with one out of a pre-determined number of severity levels, allowing the diagnostics system to separate minor faults from major faults. Examples of actions triggered by the processing circuitry 240 comprise notifying an operator of the fault state and its associated severity level, reducing an allowed operating domain of the drive unit (such as reducing maximum torque or axle speed), and also disabling the electric machine 210 in case the current state is classified as a fault state associated with a high severity level. Thus, a number of automated actions can be realized based on the computer implemented diagnostics systems disclosed herein.

To give a straight-forward example of the diagnostics systems disclosed herein, consider a self-balancing duo-prop drive unit with one 3-bladed propeller and one 4-bladed propeller. Suppose that the diagnostics system is set up to measure spectral content of the motor current, e.g., as illustrated in FIG. 4A. The system initially does not know which propellers are mounted. The system monitors motor current data in a "training phase" which can be manually triggered at the workshop or by a user, or simply be defined as the initial use-time of the drive unit when it is unlikely to have experienced fault. During the training phase a baseline spectral content is determined and normalized with respect to propeller speed, say $f_1$ in FIG. 4A. A normalization can be obtained, e.g., by dividing all frequency components in the motor current data by one of the propeller speeds, for instance the lowest propeller speed, or by an average of the propeller speeds. The system then, during operation, monitors one or more statistics of the spectral content of the motor current and compares the spectral content to the baseline spectral content, e.g., in terms of number of peaks, peak amplitudes (relative or absolute), peak frequencies, and so on, and detects a fault in case a significant deviation is detected with respect to the baseline spectral content.

Another example instead uses machine learning, where a fault model is trained to recognize various fault states using large amounts of training data connected from drive units having experienced said fault states, and also from error-free drive units where no fault state is present. In this case the system can be trained to also generate the test statistics implicitly, instead being fed by the motor current data and the speed data as is. Alternatively, test statistics derived from the motor current data and from the propeller speed data can be used, as discussed above, also as input to the machine learning algorithm realizations of the diagnostics system.

In both examples, it is the combination of the motor current data from the control unit 215 and the propeller speed data from the speed sensor system 250, 315, 325, 335 that provides the robustness and the accuracy of the diagnostics system.

The diagnostics system 200, 300 is optionally connected to a database 290, onboard the boat 100 or arranged remote from the boat 100 and accessible via, e.g., wireless communications link. The database 290 may store a plurality of expected frequency representations of the monitored motor current, i.e., a number of motor current data references (possibly in combination with corresponding propeller speed data). Each expected frequency representation or motor current reference may correspond to a given propeller system and transmission. The diagnostics system 200, 300 can compute a difference between the monitored combination of motor current data and propeller speed data and each such expected frequency representation and determine the type of propeller system and transmission from this comparison as the expected frequency representation with smallest different to the monitored motor current data and propeller speed data. The expected frequency representation may be stored as an actual frequency representation, e.g., in terms of expected amplitude magnitudes at different frequencies, or as an expected statistical distribution of the motor current data and propeller speed data. The difference can be determined using a computed difference in magnitude over frequency or using any known measure of differences between two statistical distributions, such as a Kolmogorov-Smirnoff test or a Kullback-Liebler distance measure. Another possible metric can also be a metric of the type $$D = \sum_{k=0}^{N} (m_k - r_k)^2$$

where N is a number of frequency components in a frequency representation of the motor current data, $m_k$ is a complex amplitude of the k-th monitored frequency component, $r_k$ is a complex amplitude of the k-th reference frequency component, where the monitored frequency component and the reference frequency component are both normalized based on the propeller speed data. A normalization can be obtained, e.g., by dividing all frequency components in the motor current data by one of the propeller speeds, for instance the lowest propeller speed, or by an average of the propeller speeds.

Thus, according to some aspects, the diagnostics system 200, 300 comprises processing circuitry 240 which is arranged to obtain a frequency representation of the motor current data, e.g., as exemplified in FIG. 4, and to determine a difference between the obtained frequency representation and an expected frequency representation. The processing circuitry 240 is then in a position to classify the state of the self-balancing propeller drive unit 110 into a fault state in case the difference does not satisfy an acceptance criterion.

The frequency representation of the motor current data may be obtained by the processing circuitry as a Fourier transformed or fast Fourier transformed (FFT) D component of the D-Q transformed motor current discussed above, to determine a difference between the obtained frequency representation to an expected frequency representation. This difference can be determined in terms of, e.g., variation, magnitudes, and absolute frequency location of peaks, to give a few examples. The processing circuitry 240 can then classify the state of the self-balancing propeller drive unit 110 into a fault state in case the difference does not satisfy an acceptance criterion, such as a predetermined threshold value applied to the difference, or a pre-determined range of acceptable values. Having detected occurrence of a fault in this manner, the processing circuitry 240 may proceed to select a more exact fault state in dependence of the propeller speed data out of a pre-determined number of fault states.

The techniques disclosed herein are suitable for implementation using machine learning techniques. The processing circuitry 240 may, for instance, be arranged to obtain a fault model configured to classify a state of the self-balancing propeller drive unit 110 into the pre-determined number of states, based on the combination of monitored motor current and propeller speed data, where the fault model has been trained a-priori using recorded values of the combination of monitored motor current and propeller speed data corresponding to the one or more fault states. This fault model can, for instance, be based on a random forest ensemble learning technique or on a neural network architecture. The processing circuitry 240 may also be arranged to receive an updated fault model from an external entity and to replace the fault model by the updated fault model. This allows the processing circuitry to periodically refine the fault model used in the diagnostics operation. The training data used to train the fault model may be obtained from laboratory experiments, from practical experimentation using real-world boats, or as synthetic data generated by computer simulation of various drivelines having various fault conditions and also various non-fault conditions.

The processing circuitry 240 of the diagnostics system 200, 300 may also be arranged to obtain a fault model as discussed above, and to train this fault model also during operation of the propeller drive unit 110, conditioned on the current state of the self-balancing propeller drive unit 110. The conditioning can for instance be a requirement that no fault state has been declared. In this case, as long as no fault state has been declared, the monitored motor current data and propeller speed data is used for updating the fault model. The currently classified fault state can also be used to improve detection of that fault state by adding more training data relevant to a given fault state. This is basically a method of obtaining labelled training data which can be used to refine the model during operation of the driveline.

According to other aspects, the processing circuitry 240 is arranged to determine a difference in propeller speeds between the at least two propellers 131, 132 of the propeller system 130 using the propeller speed system, and to obtain a fault model as discussed above. The processing circuitry may then train the fault model based on the monitored motor current data and propeller speed data during operation of the propeller drive unit 110, conditioned on that the difference in propeller speeds between the at least two propellers 131, 132 of the propeller system 130 satisfies an acceptance criterion. The difference in propeller speeds is here used to ensure that no serious error has occurred in the propeller system, such as loss of a propeller blade or the like, which would cause a difference in propeller speeds due to the self-balancing nature of the system.

The monitored motor current data preferably comprises D-Q transformed motor current data, in particular the D component of such D-Q transformed motor current data. Having access to motor current data, the processing circuitry 240 can be arranged to determine any of: frequency width, relative magnitude, frequency sub-band power, and frequency sub-band entropy of a Fourier transformed representation of the D-Q transformed motor current data. This type of meta-data has been shown to be an efficient input to classification algorithms such as random forest algorithms and the like.

The diagnostics system 200, 300 may also be arranged to obtain reference data related to motor current data and propeller speed data for a plurality of different propeller types, and to detect a propeller type of the propeller system 130 based on a comparison between the monitored motor current data and propeller speed data and the reference data. The different difference metrics discussed above can be used also for this purpose.

The diagnostics system 200, 300 may furthermore be arranged to obtain reference data related to motor current data and propeller speed data for a plurality of different driveline transmission types, where the processing circuitry 240 is arranged to detect a transmission type of the propeller system 130 based on a comparison between the monitored motor current data and propeller speed data and the reference data. The different difference metrics discussed above can be used also for this purpose.

Figure 5:
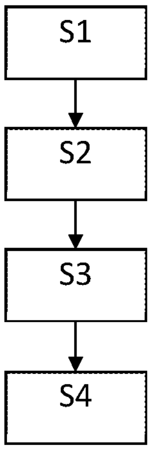
FIG. 5 is a flow chart illustrating methods.

FIG. 5 is a flow chart illustrating methods that summarize the above discussion. The flow chart illustrates a computer-implemented method for performing an automated diagnostics operation on a self-balancing propeller drive unit 110, such as that illustrated in FIGS. 1-3.

The method is performed by a diagnostics system 200, 300 and the self-balancing propeller drive unit 110 comprises a differential arrangement 230 arranged to distribute drive torque from an electric machine 210 between at least two propellers 131, 132 of a propeller system 130. The method comprises receiving S1, by processing circuitry of a computer system, propeller speed data indicative of a speed of rotation $\omega_1$, $\omega_2$ of at least one propeller axle 260, 270 of the self-balancing propeller drive unit 110, monitoring S2, by the processing circuitry, a motor current of the electric machine 210 in combination with the propeller speed data, and classifying S3, by the processing circuitry, a state of the self-balancing propeller drive unit 110 into a pre-determined number of states comprising one or more fault states, based on the combination of monitored motor current data and propeller speed data. The method also comprises triggering S4, by the processing circuitry, an action by the diagnostics system 200, 300 in case the state of the self-balancing propeller drive unit 110 is classified as a fault state.

Figure 6:
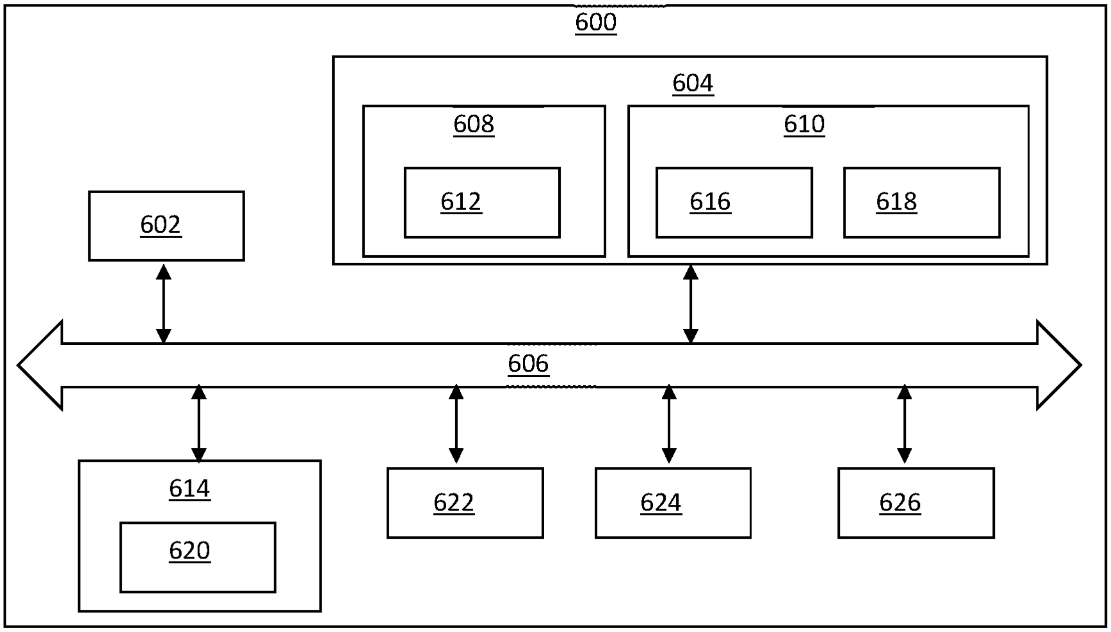
FIG. 6 is a schematic diagram of an exemplary computer system.

FIG. 6 is a schematic diagram of a computer system 600 for implementing examples disclosed herein. The computer system 600 is adapted to execute instructions from a computer-readable medium to perform these and/or any of the functions or processing described herein.

The computer system 600 may be connected (e.g., networked) to other machines in a LAN, an intranet, an extranet, or the Internet. While only a single device is illustrated, the computer system 600 may include any collection of devices that individually or jointly execute a set (or multiple sets) of instructions to perform any one or more of the methodologies discussed herein.

Accordingly, any reference in the disclosure and/or claims to a computer system, computing system, computer device, computing device, control system, control unit, electronic control unit (ECU), processor device, processing circuitry, etc., includes reference to one or more such devices to individually or jointly execute a set (or multiple sets) of instructions to perform any one or more of the methodologies discussed herein. For example, the control system may include a single control unit, or a plurality of control units connected or otherwise communicatively coupled to each other, such that any performed function may be distributed between the control units as desired. Further, such devices may communicate with each other or other devices by various system architectures, such as directly or via a Controller Area Network (CAN) bus, etc.

The computer system 600 may comprise at least one computing device or electronic device capable of including firmware, hardware, and/or executing software instructions to implement the functionality described herein. The computer system 600 may include processing circuitry 602 (e.g., incorporated into one or more processor devices or control units), a memory 604, and a system bus 606. The computer system 600 may include at least one computing device having the processing circuitry 602. The system bus 606 provides an interface for system components including, but not limited to, the memory 604 and the processing circuitry 602.

The processing circuitry 602 may include any number of hardware components for conducting data or signal processing or for executing computer code stored in memory 604. The processing circuitry 602 (e.g., of a control unit) may, for example, include a general-purpose processor, an application specific processor, a Digital Signal Processor (DSP), an Application Specific Integrated Circuit (ASIC), a Field Programmable Gate Array (FPGA), a circuit containing processing components, a group of distributed processing components, a group of distributed computers configured for processing, or other programmable logic device, discrete gate or transistor logic, discrete hardware components, or any combination thereof designed to perform the functions described herein. The processing circuitry 602 may further include computer executable code that controls operation of the programmable device.

The system bus 606 may be any of several types of bus structures that may further interconnect to a memory bus (with or without a memory controller), a peripheral bus, and/or a local bus using any of a variety of bus architectures. The memory 604 may be one or more devices for storing data and/or computer code for completing or facilitating methods described herein. The memory 604 may include database components, object code components, script components, or other types of information structure for supporting the various activities herein. Any distributed or local memory device may be utilized with the systems and methods of this description. The memory 604 may be communicably connected to the processing circuitry 602 (e.g., via a circuit or any other wired, wireless, or network connection) and may include computer code for executing one or more processes described herein. The memory 604 may include non-volatile memory 608 (e.g., read-only memory (ROM), erasable programmable read-only memory (EPROM), electrically erasable programmable read-only memory (EEPROM), etc.), and volatile memory 610 (e.g., random-access memory (RAM)), or any other medium which can be used to carry or store desired program code in the form of machine-executable instructions or data structures and which can be accessed by a computer or other machine with processing circuitry 602. A basic input/output system (BIOS) 612 may be stored in the non-volatile memory 608 and can include the basic routines that help to transfer information between elements within the computer system 600.

The computer system 600 may further include or be coupled to a non-transitory computer-readable storage medium such as the storage device 614, which may comprise, for example, an internal or external hard disk drive (HDD) (e.g., enhanced integrated drive electronics (EIDE) or serial advanced technology attachment (SATA)), HDD (e.g., EIDE or SATA) for storage, flash memory, or the like. The storage device 614 and other drives associated with computer-readable media and computer-usable media may provide non-volatile storage of data, data structures, computer-executable instructions, and the like.

A number of modules can be implemented as software and/or hard coded in circuitry to implement the functionality described herein in whole or in part. The modules may be stored in the storage device 614 and/or in the volatile memory 610, which may include an operating system 616 and/or one or more program modules 618. All or a portion of the examples disclosed herein may be implemented as a computer program product 620 stored on a transitory or non-transitory computer-usable or computer-readable storage medium (e.g., single medium or multiple media), such as the storage device 614, which includes complex programming instructions (e.g., complex computer-readable program code) to cause the processing circuitry 602 to carry out actions described herein. Thus, the computer-readable program code can comprise software instructions for implementing the functionality of the examples described herein when executed by the processing circuitry 602. The processing circuitry 602 may serve as a controller or control system for the computer system 600 that is to implement the functionality described herein.

The computer system 600 also may include an input device interface 622 (e.g., input device interface and/or output device interface). The input device interface 622 may be configured to receive input and selections to be communicated to the computer system 600 when executing instructions, such as from a keyboard, mouse, touch-sensitive surface, etc. Such input devices may be connected to the processing circuitry 602 through the input device interface 622 coupled to the system bus 606 but can be connected through other interfaces such as a parallel port, an Institute of Electrical and Electronic Engineers (IEEE) 1394 serial port, a Universal Serial Bus (USB) port, an IR interface, and the like. The computer system 600 may include an output device interface 624 configured to forward output, such as to a display, a video display unit (e.g., a liquid crystal display (LCD) or a cathode ray tube (CRT)). The computer system 600 may also include a communications interface 626 suitable for communicating with a network as appropriate or desired.

The operational steps described in any of the exemplary aspects herein are described to provide examples and discussion. The steps may be performed by hardware components, may be embodied in machine-executable instructions to cause a processor to perform the steps, or may be performed by a combination of hardware and software. Although a specific order of method steps may be shown or described, the order of the steps may differ. In addition, two or more steps may be performed concurrently or with partial concurrence.

The terminology used herein is for the purpose of describing particular aspects only and is not intended to be limiting of the disclosure. As used herein, the singular forms "a," "an," and "the" are intended to include the plural forms as well, unless the context clearly indicates otherwise. As used herein, the term "and/or" includes any and all combinations of one or more of the associated listed items. It will be further understood that the terms "comprises," "comprising," "includes," and/or "including" when used herein specify the presence of stated features, integers, steps, operations, elements, and/or components, but do not preclude the presence or addition of one or more other features, integers, steps, operations, elements, components, and/or groups thereof.

It will be understood that, although the terms first, second, etc., may be used herein to describe various elements, these elements should not be limited by these terms. These terms are only used to distinguish one element from another. For example, a first element could be termed a second element, and, similarly, a second element could be termed a first element without departing from the scope of the present disclosure.

Relative terms such as "below" or "above" or "upper" or "lower" or "horizontal" or "vertical" may be used herein to describe a relationship of one element to another element as illustrated in the Figures. It will be understood that these terms and those discussed above are intended to encompass different orientations of the device in addition to the orientation depicted in the Figures. It will be understood that when an element is referred to as being "connected" or "coupled" to another element, it can be directly connected or coupled to the other element, or intervening elements may be present. In contrast, when an element is referred to as being "directly connected" or "directly coupled" to another element, there are no intervening elements present.

Unless otherwise defined, all terms (including technical and scientific terms) used herein have the same meaning as commonly understood by one of ordinary skill in the art to which this disclosure belongs. It will be further understood that terms used herein should be interpreted as having a meaning consistent with their meaning in the context of this specification and the relevant art and will not be interpreted in an idealized or overly formal sense unless expressly so defined herein.

It is to be understood that the present disclosure is not limited to the aspects described above and illustrated in the drawings; rather, the skilled person will recognize that many changes and modifications may be made within the scope of the present disclosure and appended claims. In the drawings and specification, there have been disclosed aspects for purposes of illustration only and not for purposes of limitation, the scope of the inventive concepts being set forth in the following claims.

The invention claimed is:

1. A computer implemented diagnostics system for a marine propeller drive unit, where the propeller drive unit is a self-balancing drive unit comprising a differential arrangement arranged to distribute an input drive torque from an electric machine between at least two propellers of a propeller system, the diagnostics system comprising processing circuitry connected to a speed sensor system associated with the propeller system and to a control unit associated with the electric machine, where the speed sensor system is arranged in connection to the differential arrangement to provide propeller speed data to the processing circuitry indicative of a speed of rotation of at least one propeller axle of the self-balancing propeller drive unit, wherein the control unit is arranged to provide motor current data to the processing circuitry indicative of a motor current drawn by the electric machine, the processing circuitry is arranged to monitor the motor current data from the control unit, and the propeller speed data from the speed sensor system, and to classify a state of the self-balancing propeller drive unit into a pre-determined number of states comprising one or more fault states, based on the motor current data and on the propeller speed data, wherein at least one fault state is associated with a detected anomaly in a spectral content of the motor current data such that the spectral content does not correspond to fixed multiples of the propeller speeds, and in that the processing circuitry is arranged to trigger an action by the diagnostics system in case the state of the self-balancing propeller drive unit is classified as a fault state.

2. The diagnostics system according to claim 1, where the control unit associated with the electric machine is an inverter arranged to convert a direct current, DC, feed into an alternating current, AC, motor feed for driving the electric machine.

3. The diagnostics system according to claim 1, wherein the motor current data comprises direct-quadrature-zero, D-Q, transformed motor current data.

4. The diagnostics system according to claim 1, where the processing circuitry is arranged to obtain a frequency representation of the motor current data, to determine a difference between the obtained frequency representation and an expected frequency representation, and to classify the state of the self-balancing propeller drive unit into a fault state in case the difference does not satisfy an acceptance criterion.

5. The diagnostics system according to claim 4, where the difference between the obtained frequency representation and the expected frequency representation is determined in respect of any of: a number of frequency peaks, a frequency location of frequency peaks, a absolute and/or relative amplitude of frequency peaks, a frequency width of frequency peaks, a frequency sub-band power, and frequency sub-band entropy.

6. The diagnostics system according to claim 1, where the processing circuitry is arranged to select the fault state in dependence of the propeller speed data.

7. The diagnostics system according to claim 1, where the processing circuitry is arranged to obtain a fault model configured to classify the state of the self-balancing propeller drive unit into the pre-determined number of states, based on the monitored motor current data and on the propeller speed data, where the fault model has been trained a-priori using recorded values of combinations of monitored motor current data and propeller speed data corresponding to the one or more fault states.

8. The diagnostics system according to claim 1, where the processing circuitry is arranged to obtain a fault model configured to classify the state of the self-balancing propeller drive unit into the pre-determined number of states, based on the monitored motor current data and on the propeller speed data, and to train the fault model based on monitored motor current data and propeller speed data during operation of the propeller drive unit, conditioned on the current classified state of the self-balancing propeller drive unit.

9. The diagnostics system according to claim 1, where the processing circuitry is arranged to determine a difference in propeller speeds between the at least two propellers of the propeller system, where the processing circuitry is arranged to obtain a fault model configured to classify the state of the self-balancing propeller drive unit into the pre-determined number of states, based on the monitored motor current data and propeller speed data, and to train the fault model based on monitored motor current data and propeller speed data during operation of the propeller drive unit, conditioned on that the difference in propeller speeds between the at least two propellers of the propeller system satisfies an acceptance criterion.

10. The diagnostics system according to claim 7, wherein the fault model is based on a random forest ensemble learning technique.

11. The diagnostics system according to claim 7, wherein the fault model is based on a neural network.

12. The diagnostics system according to claim 7, where the processing circuitry is arranged to receive an updated fault model from an external entity and to replace a current fault model by the updated fault model.

13. The diagnostics system according to claim 1, where the processing circuitry is arranged to obtain reference data related to motor current data and propeller speed data for a plurality of different propeller types, where the processing circuitry is arranged to detect a propeller type of the propeller system based on a comparison between the monitored motor current data and propeller speed data and the obtained reference data.

14. The diagnostics system according to claim 1, where the processing circuitry is arranged to obtain reference data related to motor current data and propeller speed data for a plurality of different driveline transmission types, where the processing circuitry is arranged to detect a transmission type of the propeller system based on a comparison between the monitored motor current data and propeller speed data and the reference data.

15. The diagnostics system according to claim 1, wherein each fault state is associated with one out of a pre-determined number of severity levels.

16. The diagnostics system according to claim 15, wherein the triggered action comprises notifying an operator of the fault state and its associated severity level.

17. The diagnostics system according to claim 15, wherein the triggered action comprises disabling the electric machine in case the current state is classified as a fault state associated with a pre-determined severity level.

18. A computer-implemented method, for performing an automated diagnostics operation on a marine propeller drive unit, where the propeller drive unit is a self-balancing drive unit comprising a differential arrangement arranged to distribute a drive torque from an electric machine between at least two propellers of a propeller system, the method comprising:

receiving, by processing circuitry of a computer system, propeller speed data indicative of a speed of rotation of at least one propeller axle of the self-balancing propeller drive unit, monitoring, by the processing circuitry, a motor current of the electric machine in combination with the propeller speed data, classifying, by the processing circuitry, a state of the self-balancing propeller drive unit into a pre-determined number of states comprising one or more fault states, based on the combination of monitored motor current data and propeller speed data, wherein at least one fault state is associated with a detected anomaly in a spectral content of the motor current data such that the spectral content does not correspond to fixed multiples of the propeller speeds, and triggering, by the processing circuitry, an action by the diagnostics system in case the state of the self-balancing propeller drive unit is classified as a fault state.

19. A non-transitory computer-readable storage medium comprising instructions, which when executed by the processing circuitry, cause the processor device to perform the method of claim 18.

* * * * *